(12) United States Patent
Xu et al.

(10) Patent No.: US 12,480,597 B2
(45) Date of Patent: Nov. 25, 2025

(54) ELECTRIC VALVE

(71) Applicant: ZHEJIANG SANHUA COMMERCIAL REFRIGERATION CONTROLS CO., LTD, Zhejiang (CN)

(72) Inventors: Minghui Xu, Zhejiang (CN); Hanqi Wu, Zhejiang (CN)

(73) Assignee: ZHEJIANG SANHUA COMMERCIAL REFRIGERATION CONTROLS CO., LTD, Zhejiang (CN)

( * ) Notice: Subject to any disclaimer, the term of this patent is extended or adjusted under 35 U.S.C. 154(b) by 0 days.

(21) Appl. No.: 18/034,131

(22) PCT Filed: Dec. 21, 2021

(86) PCT No.: PCT/CN2021/139971
§ 371 (c)(1),
(2) Date: Apr. 27, 2023

(87) PCT Pub. No.: WO2022/143289
PCT Pub. Date: Jul. 7, 2022

(65) Prior Publication Data
US 2023/0392711 A1    Dec. 7, 2023

(30) Foreign Application Priority Data

Dec. 29, 2020 (CN) .......................... 202011600937.4
Jul. 28, 2021 (CN) .......................... 202110857831.0

(51) Int. Cl.
*F16K 31/53* (2006.01)
*F16K 31/04* (2006.01)

(52) U.S. Cl.
CPC .......... *F16K 31/535* (2013.01); *F16K 31/043* (2013.01)

(58) Field of Classification Search
CPC .............................. F16K 31/535; F16K 31/043
(Continued)

(56) References Cited

U.S. PATENT DOCUMENTS

| 2007/0068583 | A1  | 3/2007 | Johnson et al. |
| 2012/0068098 | A1* | 3/2012 | Arai ........................ F01L 1/352 475/338 |

(Continued)

FOREIGN PATENT DOCUMENTS

| CN | 101067462 A | 11/2007 |
| CN | 109869488 A | 6/2019 |

(Continued)

OTHER PUBLICATIONS

International Search Report for PCT/CN2021/139971 mailed Mar. 21, 2022, ISA/CN.

(Continued)

*Primary Examiner* — Kenneth Rinehart
*Assistant Examiner* — Nicole Gardner
(74) *Attorney, Agent, or Firm* — Yue (Robert) Xu; Apex Attorneys at Law, LLP

(57) ABSTRACT

In an electric valve provided by the present invention, a gear reduction mechanism comprises a first ring gear, a second ring gear as well as an upper planetary gear assembly and a lower planetary gear assembly arranged in the longitudinal direction of the electric valve; at least part of the first ring gear is located in an inner cavity of a rotor member; an input gear part of the rotor member meshes with planetary gears of the upper planetary gear assembly; and the lower planetary gear assembly is rotatably connected to a transmission rod. In this embodiment, at least part of the first ring gear is located in the inner cavity of the rotor member, thereby reducing the size of the electric valve.

20 Claims, 5 Drawing Sheets

(58) Field of Classification Search
USPC .......................................... 251/248, 129.11
See application file for complete search history.

(56) References Cited

U.S. PATENT DOCUMENTS

| | | |
|---|---|---|
| 2020/0292094 A1 | 9/2020 | Arai et al. |
| 2020/0386340 A1 | 12/2020 | Lv et al. |

FOREIGN PATENT DOCUMENTS

| | | | |
|---|---|---|---|
| CN | 110388496 | A | 10/2019 |
| CN | 111148928 | A | 5/2020 |
| CN | 211738083 | U | 10/2020 |
| JP | S6049153 | A | 3/1985 |
| JP | H10311384 | A | 11/1998 |
| JP | 2006009925 | A | 1/2006 |
| JP | 2006029435 | A | 2/2006 |
| JP | 2012067835 | A | 4/2012 |
| JP | 2015502507 | A | 1/2015 |
| JP | 2017198260 | A | 11/2017 |

OTHER PUBLICATIONS

First Office Action dated Mar. 19, 2024 for Japanese patent application No. 2023-546381, English translation provided by Global Dossier.

\* cited by examiner

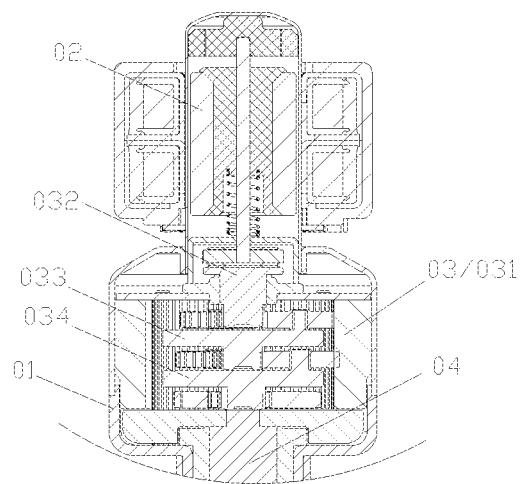
FIG. 1 --Prior Art--
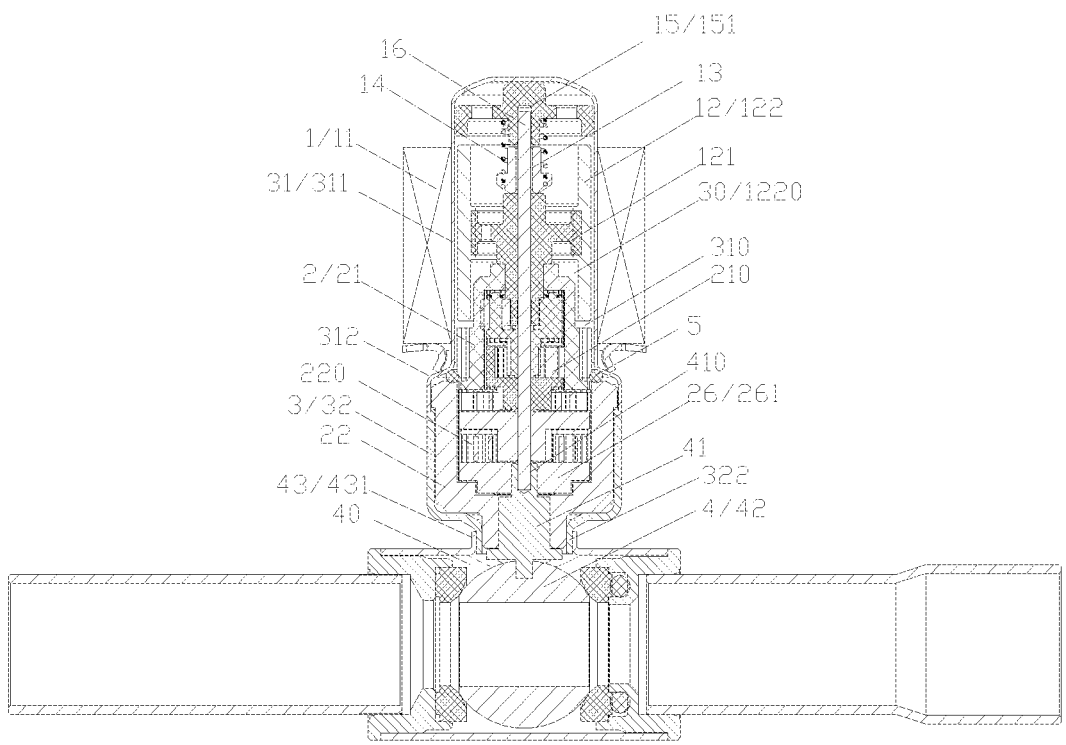
FIG. 2

ELECTRIC VALVE

This application is the national phase of international patent application No. PCT/CN2021/139971, titled "ELECTIC VALVE", filed on Dec. 21, 2021.

This application claims the benefit of priorities to the following two Chinese patent applications, both of which are incorporated herein by reference,
1) Chinese Patent Application No. 202011600937.4, titled "ELECTRIC VALVE", filed with the China National Intellectual Property Administration on Dec. 29, 2020; and
2) Chinese Patent Application No. 202110857831.0, titled "ELECTRIC VALVE", filed with the China National Intellectual Property Administration on Jul. 28, 2021.

FIELD

The present application relates to the technical field of fluid control, and in particular to an electric valve.

BACKGROUND

FIG. 1 is a partially sectioned view of an electric valve in the conventional technology. As shown in FIG. 1, the electric valve includes a housing component 01, a rotor component 02, a gear assembly 03 and a transmission rod 04. The rotor component 02 and the gear assembly 03 are arranged in an inner cavity of the housing component 01. The gear assembly 03 includes a ring gear 031, a sun gear 032, a planetary gear set 033 and an output gear set 034. The electric valve operates as follows. The rotation of the rotor component 02 drives the sun gear 032 to rotate, the rotation of the sun gear 032 drives the planetary gear set 033 to rotate, the rotation of the planetary gear set 033 drives the output gear set 034 to rotate, and the output gear set 034 in turn drives the transmission rod 04 to rotate. The electric valve having the above structure converts a small torque outputted by the rotor component 02 into a larger output torque through the gear assembly 03, so as to drive the transmission rod 04 to rotate, thereby achieving a function of the electric valve. How to optimize the structure of the electric valve to achieve miniaturization of the electric valve is a problem to be considered by those skilled in the art.

SUMMARY

It is an object of the present application to provide an electric valve. The electric valve includes a control component, a valve body component and a gear reduction mechanism. The control component includes a rotor component. The valve body component includes a transmission rod. The gear reduction mechanism includes a first ring gear, a second ring gear, and an upper planetary gear assembly and a lower planetary gear assembly arranged along a longitudinal direction of the electric valve. At least part of the first ring gear is arranged in an inner cavity of the rotor component. The rotor component includes an input gear portion, where the input gear portion meshes with a planetary gear of the upper planetary gear assembly. The planetary gear of the upper planetary gear assembly meshes with the first ring gear. A planetary gear of the lower planetary gear assembly meshes with the second ring gear, and the lower planetary gear assembly is rotatably connected to the transmission rod.

In the electric valve according to the present application, the gear reduction mechanism includes the first ring gear, the second ring gear, and the upper planetary gear assembly and the lower planetary gear assembly arranged along the longitudinal direction of the electric valve. At least part of the first ring gear is arranged in the inner cavity of the rotor component. The input gear portion of the rotor component meshes with the planetary gear of the upper planetary gear assembly, and the lower planetary gear assembly is rotatably connected to the transmission rod. According to the present application, at least part of the first ring gear is arranged in the inner cavity of the rotor component, which facilitates reducing a size of the electric valve.

BRIEF DESCRIPTION OF THE DRAWINGS

FIG. 1 shows a schematic cross-sectional view of an electric valve in the conventional technology;
FIG. 2 shows a schematic cross-sectional view of an electric valve according to the present application;
FIG. 5b shows a schematic structural view of the first ring gear in FIG. 5a.

DETAILED DESCRIPTION OF THE EMBODIMENTS

Figure 3:
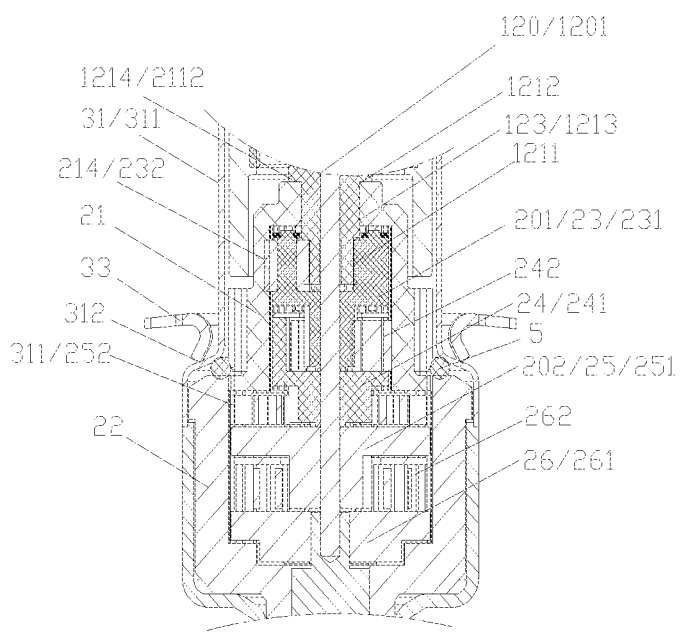
FIG. 3 shows a schematic partially enlarged view of the electric valve in FIG. 2.

In order to enable those skilled in the art to better understand technical solutions of the present application, the present application is further described in detail below in conjunction with the accompanying drawings and specific embodiments.

It should be noted herein that the orientation terms, such as upper and lower, involved in this application are defined in terms of the positions of the components and the relative positions of the components as shown in the drawings, simply for the sake of clarity and convenience in expressing the technical solutions. It should be understood that those orientation terms used herein should not be construed as limitation to the scope of protection claimed in the present application.

It should also be noted that "circumferential rotation" as used herein refers to movement in a circumferential direction and includes both movement of one revolution (360 degrees) or more and movement of less than one revolution (360 degrees).

Figure 4:
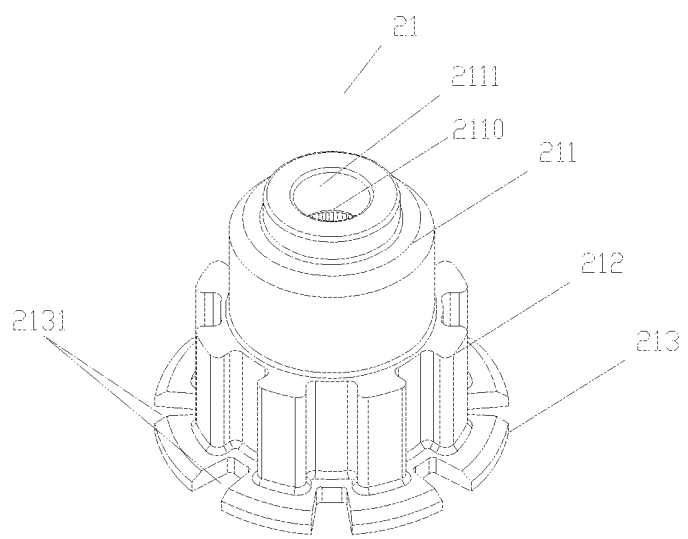
FIG. 4 shows a schematic structural view of a second ring gear in FIG. 2.
Figure 5A:
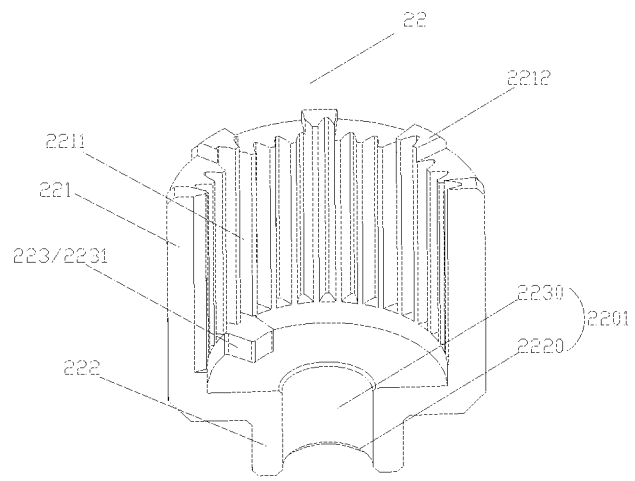
FIG. 5a shows a semi-sectional, three-dimensional view of a first ring gear in FIG. 2.
Figure 5B:
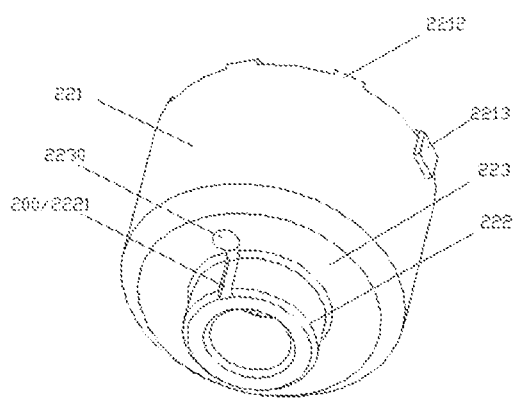
Figure 6A:
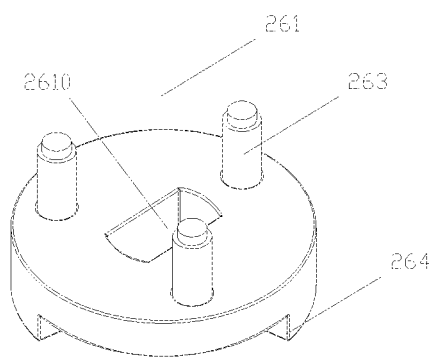
FIG. 6a shows a first three-dimensional view of an output gear carrier in FIG. 2.
Figure 6B:
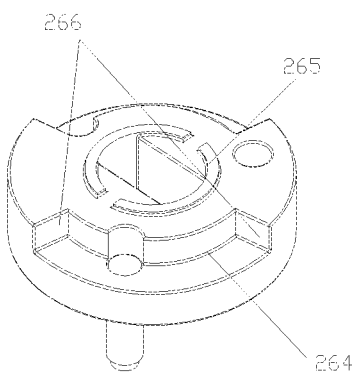
FIG. 6b shows a second three-dimensional view of the output gear carrier in FIG. 2.
Figure 7:
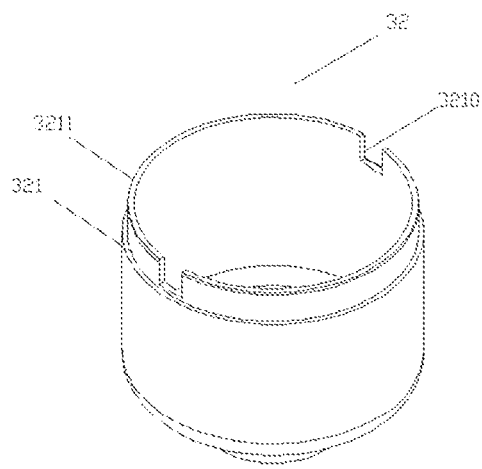
FIG. 7 shows a schematic structural view of a second housing portion in FIG. 2.
Figure 8:
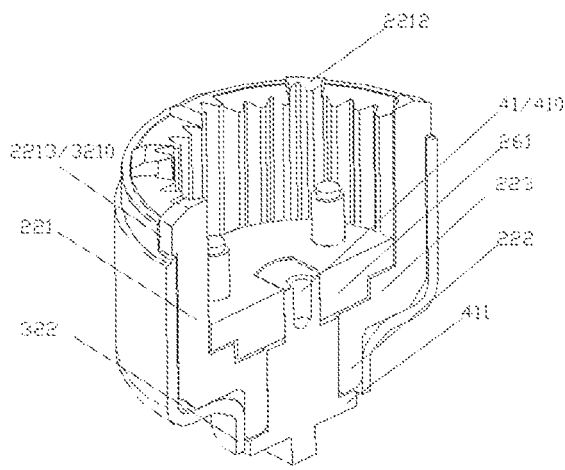
FIG. 8 shows an assembly view of the second housing portion, the first ring gear and the output gear carrier in FIG. 2.

FIG. 2 shows a schematic cross-sectional view of an electric valve according to the present application. FIG. 3 shows a schematic partially enlarged view of the electric valve in FIG. 2. FIG. 4 shows a schematic structural view of a first ring gear in FIG. 2. FIG. 5a shows a semi-sectional, three-dimensional view of a second ring gear in FIG. 2. FIG. 5b shows a schematic structural view of the second ring gear in FIG. 5a. FIG. 6a shows a first three-dimensional view of an output gear carrier in FIG. 2. FIG. 6b shows a second three-dimensional view of the output gear carrier in FIG. 2. FIG. 7 shows a schematic structural view of a second housing portion in FIG. 2. FIG. 8 shows an assembly view of the second housing portion, the second ring gear and the output gear carrier in FIG. 2.

As shown in FIGS. 2 and 3, the electric valve includes a control component 1, a gear reduction mechanism 2, a housing component 3, and a valve body component 4. A valve cavity of the electric valve includes an inner cavity 30 of the housing component and an inner cavity 40 of the valve body component. The valve body component 4 includes a transmission rod 41, a valve core 42 and a valve body 43.

The control component 1 includes a coil 11, a rotor component 12, a bearing member 13, a spring 14, a positioning seat 15 and a positioning rod 16. The coil 11 is arranged outside the housing component 3. The rotor component 12, the bearing member 13, the spring 14, the positioning seat 15 and the positioning rod 16 are arranged in the inner cavity 30 of the housing component. The coil 11, when being energized, drives the rotor component 12 to rotate in a circumferential direction. The positioning seat 15 is arranged above the rotor component 12. An upper end of the positioning rod 16 is arranged in a first blind hole 151 of the positioning seat 15, and a lower end of the positioning rod 16 is arranged in a second blind hole 410 of the transmission rod 41, thereby positioning the positioning rod 16. The positioning rod 16 extends through the bearing member 13, the rotor component 12, and a first stage planetary gear carrier 231, a second stage planetary gear carrier 241 and a third stage planetary gear carrier 251 of the gear reduction mechanism 2. The positioning of the positioning rod 16 ensures the coaxiality of the rotor component 12 with the gear reduction mechanism 2, improving the reliability of transmission between the rotor component 12 and the gear reduction mechanism 2. In addition, this arrangement also improves the stability of the operation of the gear reduction mechanism 2 and reduces the risk of jamming. Specifically, the rotor component 12 is provided with a through hole 120 through which the positioning rod 16 extends, and the positioning rod 16 is in clearance fit with a hole wall 1201 forming the through hole 120. The rotor component 12 includes a bracket 121 and a rotor 122 fixedly connected to the bracket 121. The rotor 122 is formed by sintering of magnetic powder. The bracket 121 is fixedly connected to the rotor 122 by injection moulding. The bracket 121 is provided with the through hole 120. The bracket 121 includes a shaft portion 123. A lower section of the shaft portion 123 is integrally provided with an input gear portion 1211. The bearing member 13 is arranged between the positioning seat 15 and the bracket 121. One part of the spring 14 is sleeved outside the positioning seat 15, and another part of the spring 14 is sleeved outside the bearing member 13. One end of the spring 14 abuts against the positioning seat 15, and the other end of the spring 14 abuts against the bearing member 13. The bearing member 13 abuts against the bracket 121. The spring 14 exerts an elastic force on the rotor component 12, to prevent jamming caused by axial float of the rotor component 12 during operation of the electric valve.

The gear reduction mechanism 2 is arranged in the inner cavity 30 of the housing component. The gear reduction mechanism 2 includes a first ring gear 21, a second ring gear 22, an upper planetary gear assembly 201, and a lower planetary gear assembly 202. The upper planetary gear assembly 201 includes a first stage planetary gear set 23 and a second stage planetary gear set 24, and the lower planetary gear assembly 202 includes a third stage planetary gear set 25 and a fourth stage planetary gear set 26. The first stage planetary gear set 23, the second stage planetary gear set 24, the third stage planetary gear set 25 and the fourth stage planetary gear set 26 are arranged in sequence along a longitudinal direction of the electric valve.

In an embodiment, the first stage planetary gear set 23 is arranged in an inner cavity 210 of the first ring gear and includes a first stage planetary gear carrier 231 and a first stage planetary gear 232 mounted to the first stage planetary gear carrier 231. The input gear portion 1211 meshes with the first stage planetary gear 232. The second stage planetary gear set 24 includes a second stage planetary gear carrier 241 and a second stage planetary gear 242 mounted to the second stage planetary gear carrier 241. Part of the second stage planetary gear carrier 241 is arranged in the inner cavity 210 of the first ring gear, and another part thereof in an inner cavity 220 of the second ring gear. The second stage planetary gear 242 is arranged in the inner cavity 210 of the first ring gear, and a sun gear of the first stage planetary gear carrier 231 meshes with the second stage planetary gear 242. The planetary gears of the upper planetary gear assembly 201 include the first stage planetary gear 232 and the second stage planetary gear 242. The first stage planetary gear 232 has a same modulus as the second stage planetary gear 242. It should be noted that the larger the modulus of the planetary gear is, the larger a radial size of the planetary gear is, provided that the number of teeth of the planetary gear is constant.

The third stage planetary gear set 25 and the fourth stage planetary gear set 26 are arranged in the inner cavity 220 of the second ring gear. The third stage planetary gear set 25 includes a third stage planetary gear carrier 251 and a third stage planetary gear 252 mounted to the third stage planetary gear carrier 251. A sun gear of the second stage planetary gear carrier 241 meshes with the third stage planetary gear 252. The fourth stage planetary gear set 26 includes an output gear carrier 261 and a fourth stage planetary gear 262 mounted to a pillar 263 of the output gear carrier 261. A sun gear of the third stage planetary gear carrier 251 meshes with the fourth stage planetary gear 262. In an embodiment, the planetary gears of the lower planetary gear assembly 202 include the third stage planetary gear 252 and the fourth stage planetary gear 262. The third stage planetary gear 252 has a same modulus as that of the fourth stage planetary gear 262. The modulus of each planetary gear of the upper planetary gear assembly 201 is less than that of each planetary gear of the lower planetary gear assembly 202. That is, the modulus of the second stage planetary gear 242 is less than that of the third stage planetary gear 252.

In an embodiment, the input gear portion 1211 of the rotor component 12 meshes with the first stage planetary gear 232 of the upper planetary gear assembly 201, and the first stage planetary gear 232 in turn transmits torque to the second stage planetary gear 242 via the first stage planetary gear carrier 231. Since the planetary gears of the upper planetary gear assembly 201 are closer to the rotor component 12 (a torque input end), and are subject to a small load and a low strength requirement, the planetary gears thereof are allowed to have a small modulus (a small size). The planetary gears of the lower planetary gear assembly 202 are closer to the transmission rod 41 (a torque output end) and are subject to a high load and a high strength requirement, the planetary gears thereof are required to have a large modulus (a large size). In this way, the modulus of the planetary gears of the upper planetary gear assembly is set smaller than that of the planetary gears of the lower planetary gear assembly, which facilitates reducing the size of the planetary gears of the upper planetary gear assembly and reducing a lateral dimension of the electric valve, thereby reducing the size of the electric valve.

The output gear carrier 261 includes a central hole 2610. The central hole 2610 has a non-circular cross-sectional profile. An upper end of the transmission rod 41 extends into the central hole 2610 to be rotatably connected to the output gear carrier 261, and the output gear carrier 261 drives the transmission rod 41 to rotate. The transmission rod 41 is rotatably connected to the valve core 42, and the transmission rod 41 drives the valve core 42 to rotate in order to achieve a function of the opening, closing or flow regulation of the electric valve.

In an embodiment, first inner teeth 214 extending along a longitudinal direction of the first ring gear 21 are arranged at an inner wall of the first ring gear 21. Both the first stage planetary gear 232 and the second stage planetary gear 242 mesh with the first ring gear 21 through the first inner teeth 214. Second inner teeth 2211 extending in an axial direction of the second ring gear 22 is arranged at an inner wall of the second ring gear 22. Both the third stage planetary gear 252 and the fourth stage planetary gear 262 mesh with the second ring gear 22 through the second inner teeth 2211.

Since the first stage planetary gear set 23 and the second stage planetary gear set 24 of the upper planetary gear assembly 201 are closer to the rotor component 12, the transmission torque thereof is small and the strength requirement thereof is low. Similarly, the strength requirement for the first ring gear 21, which meshes with the first stage planetary gear set 23 and the second stage planetary gear set 24, is also low. Therefore, the first stage planetary gear carrier 231, the first stage planetary gear 232, the second stage planetary gear carrier 241, and the second stage planetary gear 242 can be made of plastic, specifically by injection moulding of nylon, PPS, PEEK or the like.

The housing component 3 includes a first housing portion 31, a second housing portion 32 and a coil mounting bracket 33. The first housing portion 31 and the second housing portion 32 are produced by stretching a stainless steel sheet or tube. The first housing portion 31 is secured by welding to the second housing portion 32. The first housing portion 31 is secured by welding to the coil mounting bracket 33. The second housing portion 32 is secured by welding to the valve body 43. Specifically, the rotor component 12 is arranged in an inner cavity 310 of the first housing portion, and the coil 11 is sleeved outside the first housing portion 31 and secured to the coil mounting bracket 33. The first housing portion 31 includes an equal-diameter section 311 and a diameter-enlarged section 312. As shown in FIG. 3, the equal-diameter section 311 has a wall thickness smaller than that of the second housing portion 32. The rotor component 12 is arranged in the equal-diameter section 311, and the coil 11 is sleeved outside the equal-diameter section 311. An upper section of the second housing portion 32 is provided with an outer stepped portion 321. The diameter-enlarged section 312 is arranged at the outer stepped portion 321, and a lower end portion of the diameter-enlarged section 312 is secured by welding to the outer stepped portion 321. Due to the provision of the outer stepped portion 321, it is easy to position the first housing portion 31 and the second housing portion 32 during welding, thereby improving a welding quality.

The equal-diameter section 311 has a wall thickness smaller than that of the second housing portion 32. A thinner wall thickness of the equal-diameter section 311 facilitates increasing a magnetic flux, improving a driving efficiency of the coil 11 and reducing energy consumption. A thicker wall thickness of the second housing portion 32 facilities increasing the pressure resistance and improving the service life, and the second housing portion 32 is less likely to be damaged even under a strong refrigerant impact.

Further, as shown in FIG. 2, a lower section of the second housing portion 32 includes a diameter-reduced portion 322. The diameter-reduced portion 322 is cylindrical. The valve body 43 of the valve body component 4 includes a protrusion 431 projected towards the control component 1. The protrusion 431 is cylindrical. At least part of the diameter-reduced portion 322 is arranged in an inner cavity of the protrusion 431, and the diameter-reduced portion 322 is secured by welding to the protrusion 431. It is contemplated that at least part of the protrusion 431 may be arranged in an inner cavity of the diameter-reduced portion 322.

Further, as shown in FIGS. 2, 3 and 4, in an embodiment, the first ring gear 21 is substantially cylindrical and made of plastic, specifically by injection moulding of nylon, PPS, PEEK or the like. The first ring gear 21 is arranged in the inner cavity 310 of the first housing portion 31, while at least part of the first ring gear 21 is arranged in the inner cavity of the rotor component 12. The first ring gear 21 is arranged above the second ring gear 22. The first ring gear 21 includes a support portion 211, a positioning portion 212 and a clamping portion 213. The support portion 211 is arranged above the positioning portion 212 and the positioning portion 212 is arranged above the clamping portion 213. The positioning portion 212 has an outer diameter greater than that of the support portion 211, and the clamping portion 213 has an outer diameter greater than that of the positioning portion 212. At least part of the support portion 211 is arranged in an inner cavity 1220 of the rotor 122 and the positioning portion 212 is arranged below the rotor 122. By extending at least part of the support portion 211 into the inner cavity 1220 of the rotor 122, an axial dimension of the electric valve can be reduced, facilitating reducing the size of the electric valve and achieving miniaturization. The support portion 211 includes a through hole 2110 and supports the rotor component 12 in the longitudinal direction of the electric valve. The shaft portion 123 of the bracket 121 extends through the through hole 2110 of the support portion and extends into the inner cavity 210 of the first ring gear 21. The shaft portion 123 includes the input gear portion 1211, and the input gear portion 1211 is arranged in the inner cavity 210 of the first ring gear 21 and meshes with the first stage planetary gear 232. The shaft portion 123 is in clearance fit with a hole wall 2111, forming the through hole 2110, of the support portion 211. In this way, the reliability of transmission between the rotor component 12 and the gear reduction mechanism 2 is improved.

In an embodiment, the bracket 121 includes a lower stepped portion 1212 with a stepped surface facing downwards. The input gear portion 1211 is arranged below the lower stepped portion 1212. A stepped surface 1214 of the lower stepped portion 1212 is in contact with an upper end face 2112 of the support portion 211, and a stepped wall 1213 of the lower stepped portion 1212 is in clearance fit with the hole wall 2111 forming the through hole 2110. The support portion 211 cooperates with the lower stepped portion 1212 to rotatably support the bracket 121. That is, the rotor component 12 is rotatable circumferentially with respect to the first ring gear 21.

An outer wall of the positioning portion 212 is in clearance fit with an inner wall of the equal-diameter section 311 of the first housing portion 31. The "clearance fit" herein means a fit with a clearance (including a minimum clearance equal to zero). In an embodiment, a clearance g between an outer peripheral wall of the positioning portion 212 and the inner wall of the equal-diameter section 311 of the first housing portion 31 ranges from 0 to 0.2 mm. The positioning portion 212 is embodied as multiple ribs extending along an axial direction of the first ring gear 21, with a groove formed between adjacent ribs, thereby saving material and reducing the weight of the first ring gear 21. The clamping portion 213 includes a first recess 2131, and the second ring gear 22 includes a first protrusion 2212 projected towards the control component 1. The first protrusion 2212 is arranged at an upper end of the second ring gear 22, and the first protrusion 2212 engages with the first recess 2131 to limit a circumferential rotation of the first ring gear 21. That is, the first ring gear 21 is circumferentially limited by and connected to the second ring gear 22.

It is conceivable that, on the contrary, the clamping portion 213 may be provided with a protrusion and the second ring gear 22 may be provided with a recess, which can also achieve circumferential limiting by means of an engagement of the recess and the protrusion. Alternatively, the first ring gear 21 and the second ring gear 22 may be fixedly connected by welding.

In an embodiment, an elastic member 5 is further included. In the longitudinal direction of the electric valve, the elastic member 5 is arranged between the diameter-enlarged section 312 of the first housing portion 31 and the clamping portion 213, and elastically abuts against the inner wall of the diameter-enlarged section 312 and an upper end face of the clamping portion 213, to prevent the first ring gear 21 and the second ring gear 22 from axially moving. Here, the elastic member 5 may be an elastic ring made of a non-metallic material such as rubber as shown in FIG. 2, or may be an elastic sheet made of metal. The first ring gear 21 is radially limited by the positioning rod 16. The second ring gear 22 is circumferentially limited by the second housing portion 32 (in the embodiment, the second housing portion 32 engages with the second ring gear 22 by means of the recess and the protrusion to achieve circumferential limitation, as described later). The first ring gear 21 is circumferentially limited by the second ring gear 22, and the first ring gear 21 is axially limited by the first housing portion 31, so that the first ring gear 21 and the second ring gear 22 can be positioned without welding. In this way, components are assembled simply without welding.

As shown in FIGS. 5a and 8, the second ring gear 22 is of a one-piece structure. The second ring gear is generally cylindrical with a large top and a small bottom, and is produced by metallurgy of metal powder. The second ring gear 22 includes a large diameter section 221 and a small diameter section 222. The second inner teeth 2211 are arranged at an inner peripheral wall of the large diameter section 221 and the first protrusion 2212 is arranged at an upper end of the large diameter section 221. The large diameter section 221 includes a second protrusion 2213 which projects radially outwards from an outer peripheral wall of the large diameter section 221. A stepped wall 3211 of the outer stepped portion 321 of the second housing portion 32 includes a second recess 3210. The second protrusion 2213 engages with the second recess 3210 to limit the circumferential rotation of the second ring gear 22. In the embodiment, since the second ring gear 22 is produced by metallurgy of metal powder, the second inner teeth 2211, the first protrusion 2212 and the second protrusion 2213 are formed in one piece during manufacturing, which is easy for processing. The second housing portion 32 is produced by stretching a metal sheet or tube, and the second recess 3210 can be formed just by lathing, which is easy for processing. In addition, the second ring gear 22 and the second housing portion 32 are positioned by means of an engagement of the recess and the protrusion, which is simple for assembling.

It is conceivable that, on the contrary, the second ring gear 22 may be provided with a recess and the second housing portion 32 may be provided with a protrusion, which can also achieve circumferential limiting by means of an engagement of the recess and the protrusion. Alternatively, the second ring gear 22 and the second housing portion 32 may be fixedly connected by welding.

Further, as shown in FIGS. 2, 5a and 8, at least part of the small diameter section 222 is arranged in the inner cavity of the diameter-reduced portion 322 of the second housing portion 32. The second ring gear 22 includes a through hole 2201 extending along the longitudinal direction of the electric valve. The transmission rod 41 extends through the through hole 2201 and is in clearance fit with a hole wall forming the through hole 2201. The transmission rod 41 is rotatable relative to the second ring gear 22. An upper end of the transmission rod 41 is arranged in the inner cavity 30 of the housing component and a lower end of the transmission rod 41 is arranged in the inner cavity 40 of the valve body component. The second ring gear 32 is produced by metallurgy of self-lubricating metal powder, so that the transmission rod 41 rotates with low frictional resistance, the wearing of the transmission rod 41 during the rotation is reduced, and the service life is improved. The second ring gear 32 in the embodiment integrates the function of a bearing, so that no additional bearing is required, and the number of components is reduced.

Further, as shown in FIGS. 5a, 6a, 6b and 8, the second ring gear 22 further includes a transition section 223. The transition section 223 is arranged between the large diameter section 221 and the small diameter section 222. The output gear carrier 261 is arranged above the transition section 223. The through hole 2201 of the second ring gear 22 includes an inner hole 2220 of the small diameter section 222 and an inner hole 2230 of the transition section 223.

The second ring gear 22 further includes a limiting protrusion 2231. The limiting protrusion 2231 projects from the transition section 223 towards the control component 1. Further, the limiting protrusion 2231 is connected to the inner peripheral wall of the large diameter section 221 and, in the case of metal powder metallurgy, the limiting protrusion 2231 is integrally formed at the second ring gear 22. A limiting groove 264 is arranged at a side, facing towards the valve body component 4, of the output gear carrier 261. At least part of the limiting protrusion 2231 is arranged in the limiting groove 264, and the limiting protrusion 2231 is able to abut against two groove walls 266 of the limiting groove 264 to limit the rotational stroke of the output gear carrier 261, i.e. to limit the rotational stroke of the transmission shaft 41. In this way, the rotational stroke of the valve core 42 may be limited to achieve functions of the full opening, full closing and flow regulation of the electric valve. It should be noted that the valve core of the electric valve in the embodiment is embodied as a spherical valve core. If it is defined that the electric valve is in the fully closed state when the valve core is rotated by 0 degrees, the fully open state is reached when the valve core is rotated by 90 degrees, i.e. the two groove walls 266 of the limiting groove 264 limit the maximum stroke of rotation of the output gear carrier 261 to 90 degrees. In the embodiment, the valve core 42 is substantially spherical but may not be limited to a spherical shape. It may also be, for example, hemispherical, or spindle-shaped.

Further, two limiting protrusions 2231 are provided and are symmetrical with respect to the central axis of the through hole 2220 of the small diameter section 222. Accordingly, two limiting grooves 264 are provided to cooperate with the limiting protrusions 2231. In this way, the circumferential rotation of the output gear carrier 261 is smooth, and the output gear carrier 261 is limited reliably.

A third protrusion 265 is arranged at a side, facing towards the valve body component 4, of the output gear carrier 261. A lower end portion of the third protrusion 265 is substantially an arc-shaped platform. The third protrusion 265 abuts against the transition section 223. The provision of the third protrusion 265 can reduce a contact area between the output gear carrier 261 and the transition section 223, thereby decreasing the wearing of the output gear carrier 261 and increasing the service life.

As shown in FIG. 8, the transmission rod 41 includes a flange portion 411. The flange portion 411 is arranged below the small diameter section 222 of the second ring gear 22, and the flange portion 411 may abut against the lower end of the small diameter section 222 to limit the axial upward movement of the transmission rod 41, so as to prevent the transmission rod 41 from distorting the output gear carrier 261 and weakening the reliable transmission of the gear reduction mechanism 2.

Further, the second ring gear 22 includes a communication passage 200 through which the inner cavity 220 of the second ring gear 22 is communicated with the inner cavity 40 of the valve body component. The communication passage 200 includes a communication hole 2230 and a side slot 2221. The communication hole 2230 is communicated with the side slot 2221. The communication hole 2230 is defined in the transition section 223, and extends through the transition section 223. The side slot 2221 is defined in the outer peripheral wall of the small diameter section 222, and extends along the longitudinal direction of the second ring gear 22. By providing the communication passage 200, fluid is introduced into the inner cavity 220 of the second ring gear 22, which enhances the internal circulation of the electric valve, and lubricates and dissipates heat from the gear reduction mechanism 2, thereby increasing the service life.

Figure 9:
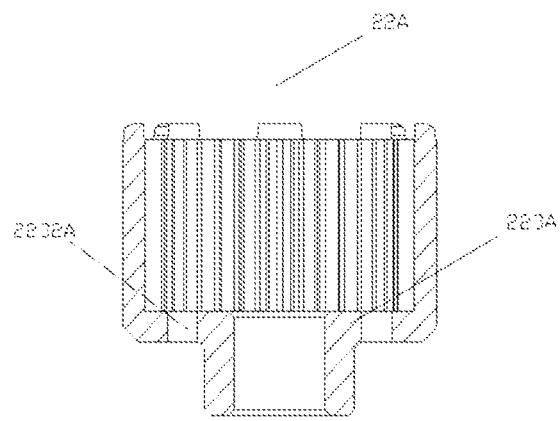
FIG. 9 shows a cross-sectional view of the first ring gear of another structure according to the present application.
Figure 10:
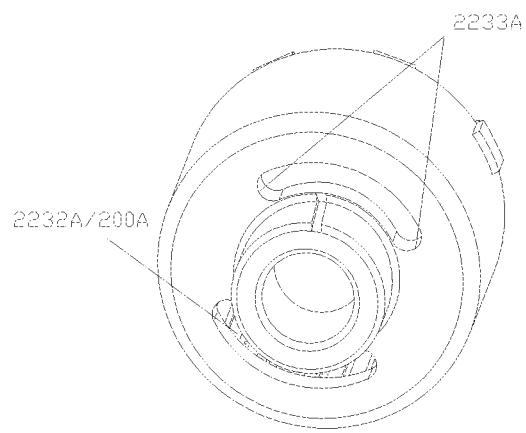
FIG. 10 shows a schematic structural view of the first ring gear in FIG. 9.
Figure 11:
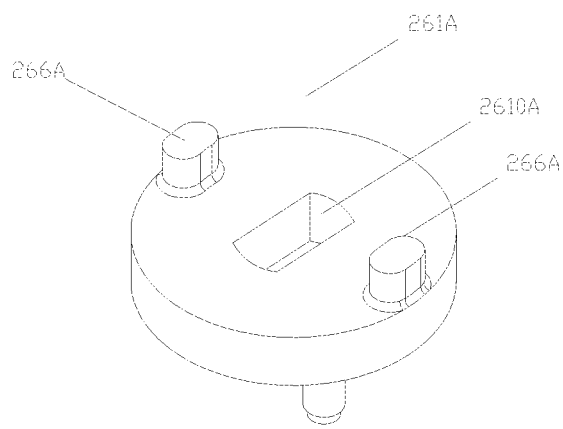
FIG. 11 shows a schematic structural view of the output gear carrier of another structure according to the present application.

FIG. 9 shows a cross-sectional view of the second ring gear of another structure according to the present application. FIG. 10 shows a schematic structural view of the second ring gear in FIG. 9. FIG. 11 shows a schematic structural view of the output gear carrier of another structure according to the present application.

As shown in FIGS. 9, 10 and 11, the present embodiment differs from the above embodiment mainly in an cooperation structure of the second ring gear and the output gear carrier.

The second ring gear 22A includes a transition section 223A, and the output gear carrier 261A is arranged in the transition section 223A. The transition section 223A includes an arc-shaped hole 2232A, as shown in FIG. 10. The arc-shaped hole 2232A is an arc-shaped through or blind hole. A limiting boss 266A is arranged at a side, facing towards the valve body component 4, of the output gear carrier 261A. At least part of the limiting boss 266A is arranged in the arc-shaped hole 2232A, and the limiting boss 266A is able to abut against two end walls 2233A forming the arc-shaped hole 2232A to limit the rotational stroke of the output gear carrier 261A, i.e. to limit the rotational stroke of the transmission shaft 41. In this way, the rotational stroke of the valve core 42 may be limited to achieve functions of the full opening, full closing and flow regulation of the electric valve. It should be noted that the valve core of the electric valve in the embodiment is embodied as a spherical valve core. If it is defined that the electric valve is in the fully closed state when the valve core is rotated by 0 degrees, the fully open state is reached when the valve core is rotated by 90 degrees, i.e. the two end walls 2233A of the arc-shaped hole 2232A limit the maximum stroke of rotation of the output gear carrier 261A to 90 degrees.

As shown in FIG. 10, the present embodiment further differs from the above embodiment in the communication passage of the second ring gear.

In the embodiment, the second ring gear 22A includes a communication passage 200A through which the inner cavity 220 of the second ring gear is communicated with the inner cavity 40 of the valve body component. The communication passage 200A includes the arc-shaped hole 2232A and the above side slot 2221. The arc-shaped hole 2232A is communicated with the above side slot 2221. The arc-shaped hole 2232A is a through hole which extends through the transition section 223A. That is, the arc-shaped hole 2232A not only circumferentially limits the output gear carrier 261A, but also functions as a communication hole. The second ring gear 22A in the embodiment does not require the provision of the communication hole.

Further, two limiting bosses 266A are provided and are symmetrical with respect to the central axis of a central hole 2610A. Accordingly, two arc-shaped holes 2232A are provided to cooperate with the limiting bosses 266A. In this way, the circumferential rotation of the output gear carrier 261A is smooth, and the output gear carrier 261A is limited reliably.

The limiting manner is not limited to this. As a variant embodiment, the second ring gear may be provided with a limiting protrusion, and the output gear carrier may be provided with a limiting boss. The limiting boss may cooperate with the limiting protrusion to limit the circumferential rotation stroke of the output gear carrier.

The principle and the embodiments of the present application are illustrated herein by specific examples. The above description of examples is merely intended to facilitate understanding the method and core concept of the present application. It should be noted that, for those skilled in the art, many modifications and improvements may be made to the present application without departing from the principle of the present application, and these modifications and improvements are also deemed to fall into the scope of protection of the present application defined by the appended claims.

The invention claimed is:

1. An electric valve, comprising a control component, a valve body component and a gear reduction mechanism, wherein the control component comprises a rotor component; the valve body component comprises a transmission rod; the gear reduction mechanism comprises a first ring gear, a second ring gear, and an upper planetary gear assembly and a lower planetary gear assembly arranged along a longitudinal direction of the electric valve; at least part of the first ring gear is arranged in an inner cavity of the rotor component; the rotor component comprises an input gear portion, wherein the input gear portion is meshed with a planetary gear of the upper planetary gear assembly; the planetary gear of the upper planetary gear assembly is meshed with the first ring gear; a planetary gear of the lower planetary gear assembly is meshed with the second ring gear; and the lower planetary gear assembly is rotatably connected to the transmission rod, wherein the rotor component comprises a rotor and a bracket fixedly connected to each other; at least part of the first ring gear is arranged in an inner cavity of the rotor; the second ring gear is arranged below the rotor; the bracket comprises the input gear portion; and a modulus of the planetary gear of the upper planetary gear assembly is smaller than a modulus of the planetary gear of the lower planetary gear assembly.

2. The electric valve according to claim 1, further comprising a housing component, wherein the rotor component, the upper planetary gear assembly and the lower planetary gear assembly are arranged in an inner cavity of the housing component; the bracket comprises a lower stepped portion with a stepped surface facing downwards; the input gear portion is arranged below the lower stepped portion; the first ring gear comprises a support portion; the support portion comprises a through hole; the stepped surface of the lower stepped portion is in contact with an upper end surface of the support portion; a stepped wall of the lower stepped portion is in clearance fit with a hole wall forming the through hole; and at least part of the support portion is arranged in the inner cavity of the rotor.

3. The electric valve according to claim 2, wherein the first ring gear further comprises a positioning portion; the support portion is arranged above the positioning portion; the rotor is arranged above the positioning portion; an outer diameter of the positioning portion is greater than an outer diameter of the support portion; and an outer wall of the positioning portion is in clearance fit with an inner wall of the housing component.

4. The electric valve according to claim 3, wherein the housing component comprises a first housing portion and a second housing portion; the first housing portion comprises an equal-diameter section and a diameter-enlarged section; the rotor component is arranged in the equal-diameter section; the outer wall of the positioning portion is in clearance fit with an inner wall of the equal-diameter section; a coil of the control component is sleeved outside the equal-diameter section; and the diameter-enlarged section is fixedly connected to the second housing portion.

5. The electric valve according to claim 3, wherein the first ring gear further comprises a clamping portion; an outer diameter of the clamping portion is greater than an outer diameter of the positioning portion; the clamping portion comprises a first recess, the second ring gear comprises a first protrusion projected towards the control component, and the first protrusion is engaged with the first recess; or the clamping portion comprises a first protrusion projected towards the valve body component, the second ring gear comprises a first recess, and the first protrusion is engaged with the first recess.

6. The electric valve according to claim 5, wherein the second ring gear comprises a large diameter section and a small diameter section; the first protrusion is arranged at an upper end of the large diameter section; the large diameter section comprises a second protrusion projected radially outwards from an outer peripheral wall of the large diameter section; an upper section of the second housing portion comprises a second recess; the second protrusion is engaged with the second recess; a lower section of the second housing portion comprises a diameter-reduced portion; at least part of the small diameter section is arranged in an inner cavity of the diameter-reduced portion; the small diameter section is in clearance fit with the diameter-reduced portion; and the diameter-reduced portion is fixedly connected to a valve body of the valve body component.

7. The electric valve according to claim 2, wherein the control component further comprises a positioning seat and a positioning rod; the positioning seat is arranged above the rotor component; the positioning rod is directed through a through hole of the rotor component; the positioning rod is in clearance fit with a hole wall forming the through hole; an upper end of the positioning rod is arranged in a first blind hole of the positioning seat; and a lower end of the positioning rod is arranged in a second blind hole of the transmission rod.

8. The electric valve according to claim 2, wherein the first ring gear and the upper planetary gear assembly are made of plastic material.

9. The electric valve according to claim 1, wherein the control component further comprises a positioning seat and a positioning rod; the positioning seat is arranged above the rotor component; the positioning rod is directed through a through hole of the rotor component; the positioning rod is in clearance fit with a hole wall forming the through hole; an upper end of the positioning rod is arranged in a first blind hole of the positioning seat; and a lower end of the positioning rod is arranged in a second blind hole of the transmission rod.

10. The electric valve according to the claim 9, wherein the positioning rod is directed through a first stage planetary gear carrier and a second stage planetary gear carrier of the upper planetary gear assembly and a third stage planetary gear carrier and an output gear carrier of the lower planetary gear assembly; and the output gear carrier is rotatably connected to the transmission rod.

11. The electric valve according to claim 1, wherein the first ring gear and the upper planetary gear assembly are made of plastic material.

12. An electric valve, comprising a control component, a valve body component and a gear reduction mechanism, wherein the control component comprises a rotor component; the valve body component comprises a transmission rod; the gear reduction mechanism comprises a first ring gear, a second ring gear, and an upper planetary gear assembly and a lower planetary gear assembly arranged along a longitudinal direction of the electric valve; at least part of the first ring gear is arranged in an inner cavity of the rotor component; the rotor component comprises an input gear portion, wherein the input gear portion is meshed with a planetary gear of the upper planetary gear assembly; the planetary gear of the upper planetary gear assembly is meshed with the first ring gear; a planetary gear of the lower planetary gear assembly is meshed with the second ring gear; and the lower planetary gear assembly is rotatably connected to the transmission rod, wherein the upper planetary gear assembly comprises a first stage planetary gear set and a second stage planetary gear set; the lower planetary gear assembly comprises a third stage planetary gear set and a fourth stage planetary gear set; at least part of the first stage planetary gear set is arranged in the inner cavity of the rotor component; the first stage planetary gear set and part of the second stage planetary gear set are arranged in an inner cavity of the first ring gear; and the third stage planetary gear set, the fourth stage planetary gear set and another part of the second stage planetary gear set are arranged in an inner cavity of the second ring gear.

13. The electric valve according to claim 12, wherein the first ring gear comprises first internal teeth; a first stage planetary gear of the first stage planetary gear set and a second stage planetary gear of the second stage planetary gear set are meshed with the first internal teeth; the second ring gear comprises second internal teeth; a third stage planetary gear of the third stage planetary gear set and a fourth stage planetary gear of the fourth stage planetary gear set are meshed with the second internal teeth; the planetary gear of the upper planetary gear assembly comprises the first stage planetary gear and the second stage planetary gear; a modulus of the first stage planetary gear is the same as a modulus of the second stage planetary gear; the planetary gear of the lower planetary gear assembly comprises the third stage planetary gear and the fourth stage planetary gear; and a modulus of the third stage planetary gear is the same as a modulus of the fourth stage planetary gear.

14. The electric valve according to claim 13, wherein the first ring gear and the upper planetary gear assembly are made of plastic material.

15. The electric valve according to claim 13, wherein the control component further comprises a positioning seat and a positioning rod; the positioning seat is arranged above the rotor component; the positioning rod is directed through a through hole of the rotor component; the positioning rod is in clearance fit with a hole wall forming the through hole; an upper end of the positioning rod is arranged in a first blind hole of the positioning seat; and a lower end of the positioning rod is arranged in a second blind hole of the transmission rod.

16. The electric valve according to the claim 15, wherein the positioning rod is directed through a first stage planetary gear carrier and a second stage planetary gear carrier of the upper planetary gear assembly and a third stage planetary gear carrier and an output gear carrier of the lower planetary gear assembly; and the output gear carrier is rotatably connected to the transmission rod.

17. The electric valve according to claim 12, wherein the control component further comprises a positioning seat and a positioning rod; the positioning seat is arranged above the rotor component; the positioning rod is directed through a through hole of the rotor component; the positioning rod is in clearance fit with a hole wall forming the through hole; an upper end of the positioning rod is arranged in a first blind hole of the positioning seat; and a lower end of the positioning rod is arranged in a second blind hole of the transmission rod.

18. The electric valve according to the claim 17, wherein the positioning rod is directed through a first stage planetary gear carrier and a second stage planetary gear carrier of the upper planetary gear assembly and a third stage planetary gear carrier and an output gear carrier of the lower planetary gear assembly; and the output gear carrier is rotatably connected to the transmission rod.

19. The electric valve according to claim 12, wherein the first ring gear and the upper planetary gear assembly are made of plastic material.

20. An electric valve, comprising a control component, a valve body component and a gear reduction mechanism, wherein the control component comprises a rotor component; the valve body component comprises a transmission rod; the gear reduction mechanism comprises a first ring gear, a second ring gear, and an upper planetary gear assembly and a lower planetary gear assembly arranged along a longitudinal direction of the electric valve; at least part of the first ring gear is arranged in an inner cavity of the rotor component; the rotor component comprises an input gear portion, wherein the input gear portion is meshed with a planetary gear of the upper planetary gear assembly; the planetary gear of the upper planetary gear assembly is meshed with the first ring gear; a planetary gear of the lower planetary gear assembly is meshed with the second ring gear; and the lower planetary gear assembly is rotatably connected to the transmission rod, wherein the control component further comprises a positioning seat and a positioning rod; the positioning seat is arranged above the rotor component; the positioning rod is directed through a through hole of the rotor component; the positioning rod is in clearance fit with a hole wall forming the through hole; an upper end of the positioning rod is arranged in a first blind hole of the positioning seat; and a lower end of the positioning rod is arranged in a second blind hole of the transmission rod, wherein the positioning rod is directed through a first stage planetary gear carrier and a second stage planetary gear carrier of the upper planetary gear assembly and a third stage planetary gear carrier and an output gear carrier of the lower planetary gear assembly; and the output gear carrier is rotatably connected to the transmission rod.

* * * * *